（12） United States Patent
Nishio et al.

(10) Patent No.: US 8,562,194 B2
(45) Date of Patent: Oct. 22, 2013

(54) WAVELENGTH CONVERSION UNIT AND ILLUMINATION APPARATUS INCLUDING THE UNIT

(75) Inventors: Masahiro Nishio, Akiruno (JP); Takeshi Ito, Hino (JP); Hiroyuki Kamee, Ebina (JP)

(73) Assignee: Olympus Corporation, Tokyo (JP)

( * ) Notice: Subject to any disclaimer, the term of this patent is extended or adjusted under 35 U.S.C. 154(b) by 204 days.

(21) Appl. No.: 13/009,042

(22) Filed: Jan. 19, 2011

(65) Prior Publication Data

US 2011/0176290 A1 Jul. 21, 2011

(30) Foreign Application Priority Data

Jan. 20, 2010 (JP) ................................ 2010-010444

(51) Int. Cl.
*F21V 7/04* (2006.01)
*G02B 7/02* (2006.01)
*G05D 25/00* (2006.01)

(52) U.S. Cl.
USPC ........ 362/552; 362/84; 362/311.02; 362/555; 362/582

(58) Field of Classification Search
USPC .............. 362/84, 232, 311.02, 551–555, 583, 362/582
See application file for complete search history.

(56) References Cited

U.S. PATENT DOCUMENTS 7,356,054 B2 * 4/2008 Hama et al. .................... 372/21

FOREIGN PATENT DOCUMENTS

JP 2005-205195 8/2005

* cited by examiner

*Primary Examiner* — Jason Moon Han
(74) *Attorney, Agent, or Firm* — Scully, Scott, Murphy & Presser, P.C.

(57) ABSTRACT

A wavelength conversion unit includes a wavelength conversion member that transmits a part of incident excitation light and converts a part of the excitation light into wavelength-converted light having a wavelength different from a wavelength of the excitation light to emit the wavelength-converted light. The excitation light has an intensity distribution in which an intensity is maximum at the center and decreases as getting apart from the center. A thickness of the wavelength conversion member at a portion into which light at the center of the intensity distribution of the excitation light enters is larger than those at any other portions.

4 Claims, 9 Drawing Sheets

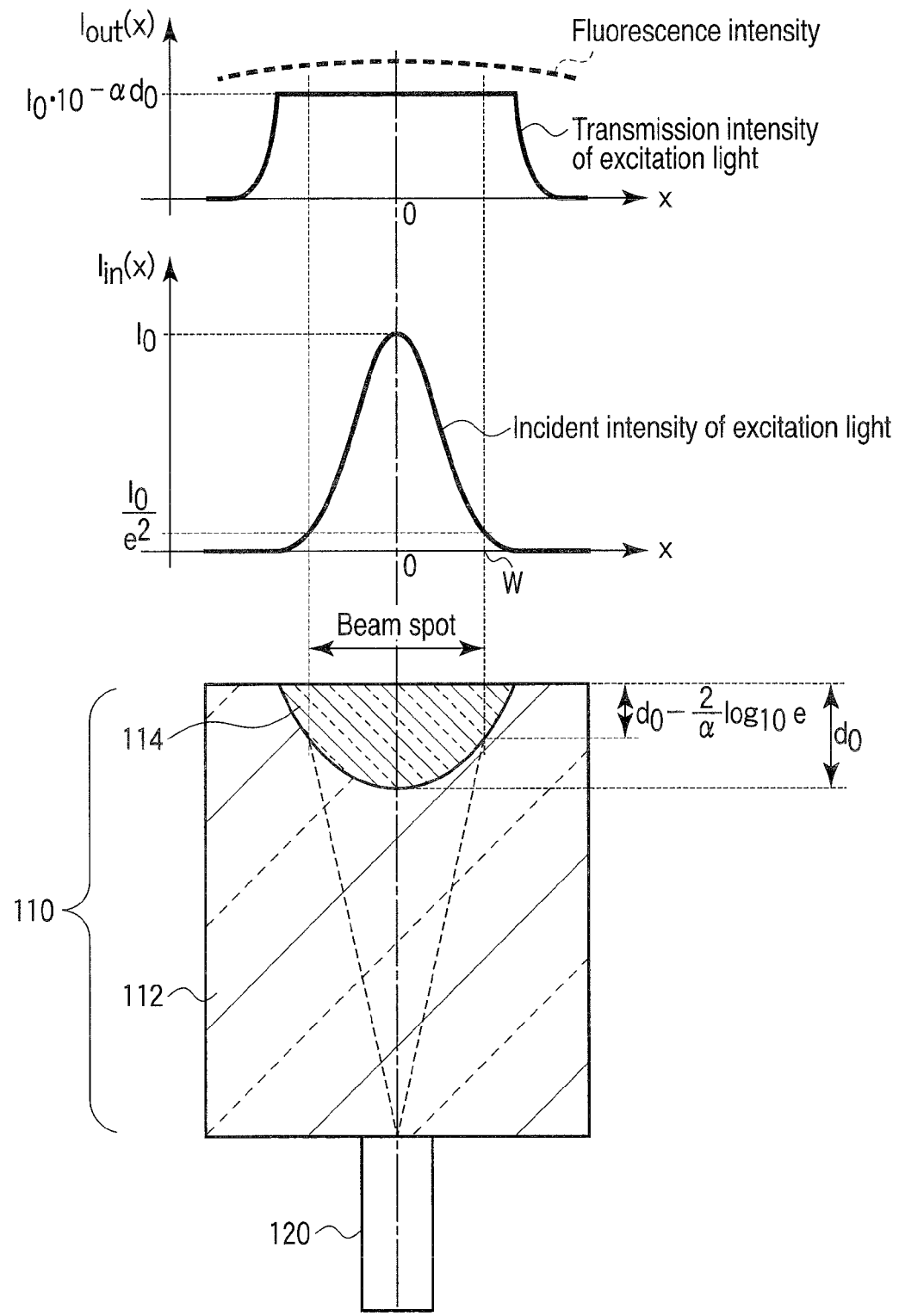
F I G. 1

WAVELENGTH CONVERSION UNIT AND ILLUMINATION APPARATUS INCLUDING THE UNIT

CROSS-REFERENCE TO RELATED APPLICATIONS

This application is based upon and claims the benefit of priority from prior Japanese Patent Application No. 2010-010444, filed Jan. 20, 2010, the entire contents of which are incorporated herein by reference.

BACKGROUND OF THE INVENTION

1. Field of the Invention

The present invention relates generally to an illumination apparatus including a wavelength conversion unit.

2. Description of the Related Art

FIG. 11 shows a light-emitting apparatus, which is a conventional example of an illumination apparatus including a wavelength conversion unit. The light-emitting apparatus has an excitation light source 10 that emits excitation light 1, a wavelength conversion member 30 that absorbs the excitation light 1 emitted from the excitation light source 10 and performs wavelength conversion to emit illumination light 2 in a predetermined wavelength band, and an optical fiber 20 that leads the excitation light 1 emitted from the excitation light source 10 to the wavelength conversion member 30. The excitation light source 10 includes a light-emitting element 11 and leads light emitted from the light-emitting element 11 to the optical fiber 20 from an exit portion 12. In order to efficiently lead the light emitted from the light-emitting element 11 to the exit portion 12, a lens 13 is provided between the light-emitting element 11 and the exit portion 12. One end of the optical fiber 20 is connected to the exit portion 12, and the other end is provided with an output portion 21 from which the light is led to the outside. The output portion 21 includes a wavelength conversion member 30 to constitute a wavelength conversion unit. A fluorescent material 31 is used as the wavelength conversion member 30. The wavelength conversion member 30 absorbs the excitation light 1 emitted from the excitation light source 10 and performs the wavelength conversion to emit the illumination light in the predetermined wavelength band.

In a conventional illumination apparatus, when the wavelength conversion member is irradiated with the excitation light, the wavelength conversion member emits light in which wavelength-converted light obtained by converting the excitation light by the wavelength conversion member is mixed with the excitation light transmitted through the wavelength conversion member without being converted into the wavelength-converted light. An intensity of the excitation light that exits from the optical fiber and then enters the wavelength conversion member has a distribution in which the intensity is maximum at the center (a region near a central axis of the optical fiber) and decreases as getting closer to the periphery from the center. Since the excitation light is subjected to the wavelength conversion at a point where it is absorbed, so that the wavelength-converted light is emitted in all directions, and a part of the wavelength-converted light is repeatedly scattered in the wavelength conversion member and then exits, it exits with being uniformed to some extent. On the other hand, since the excitation light transmitted without being converted into the wavelength-converted light has high direct advance properties, the transmitted excitation light exits with high intensity at the center. As a result, an intensity ratio of the excitation light and the wavelength-converted light differs depending on the center and a region apart from the center, and color shading occurs in the light having the transmitted excitation light and the wavelength-converted light mixed therein.

BRIEF SUMMARY OF THE INVENTION

An object of the invention is to provide a wavelength conversion unit in which color shading of exiting mixed color light is reduced.

According to an aspect of embodiments, a wavelength conversion unit includes a wavelength conversion member that transmits a part of incident excitation light and converts a part of the excitation light into wavelength-converted light having a wavelength different from a wavelength of the excitation light to emit the wavelength-converted light. The excitation light has an intensity distribution in which an intensity is maximum at the center and decreases as getting apart from the center. A thickness of the wavelength conversion member at a portion into which light at the center of the intensity distribution of the excitation light enters is larger than those at any other portions.

According to an aspect of embodiments, a wavelength conversion unit in which color shading of exiting mixed color light is reduced is provided.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows a configuration of a fluorescent substance unit according to a first embodiment of the present invention;

DETAILED DESCRIPTION OF THE INVENTION

An embodiment according to the present invention will now be described hereinafter with reference to the accompanying drawings.

First Embodiment

[Configuration]

FIG. 1 shows a fluorescent substance unit 110, which is a wavelength conversion unit according to a first embodiment of the present invention. Further, FIG. 2 shows an illumination apparatus including the fluorescent substance unit depicted in FIG. 1.

Figure 2:
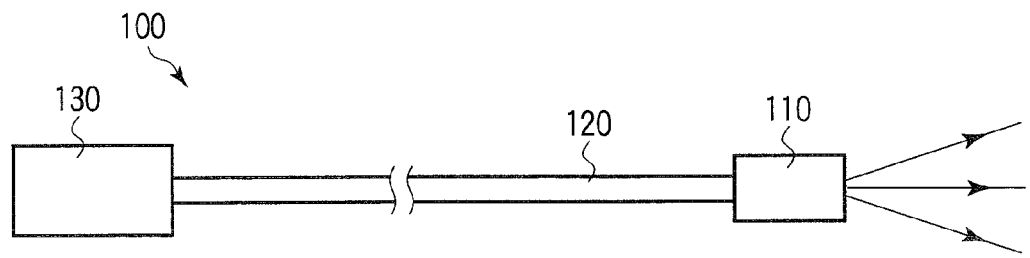
FIG. 2 shows an illumination apparatus including the fluorescent substance unit depicted in FIG. 1.

As shown in FIG. 2, an illumination apparatus 100 has an excitation light source 130 to emit excitation light, a fluorescent substance unit 110, which is a wavelength conversion unit to convert a wavelength of the excitation light, and a light guide member 120 to guide the excitation light emitted from the excitation light source 130 to the fluorescent substance unit 110. It is to be noted that the fluorescent substance unit 110 will be also referred to as a wavelength conversion unit 110 in the following description.

The excitation light emitted from the excitation light source 130 has an intensity distribution in which the intensity is maximum at the center and decreases as getting apart from the center. The excitation light source 130 is, but not limited to, a semiconductor laser to emit light in a blue-violet to blue region in an example.

The light guide member 120 may comprise any optical component having a function of guiding the excitation light, but it typically comprises an optical fiber. Therefore, in the following description, the light guide member 120 will be also referred to as an optical fiber 120. Furthermore, the optical fiber 120 is, but not limited to, a multi-mode fiber having a numerical aperture Fna=0.2 in an example.

As shown in FIG. 1, the wavelength conversion unit 110 comprises a transparent member 112 and a wavelength conversion member 114. The wavelength conversion member 114 has a function of transmitting a part of the incident excitation light, and converting a part of the excitation light into wavelength-converted light having a wavelength different from a wavelength of the excitation light to emit the wavelength-converted light. Although the wavelength conversion member 114 may comprise any optical component having such a function, it typically comprises a fluorescent substance. In this case, the wavelength-converted light is fluorescence. Therefore, the wavelength conversion member 114 will be also referred to as a fluorescent substance 114 hereinafter. That is, in other words, the fluorescent substance unit 110 comprises the transparent member 112 and the fluorescent substance 114.

The transparent member 112 has, e.g., a columnar shape, and an exit end of the optical fiber 120 is connected to a circular end surface of the transparent member 112. An end portion of the transparent member 112 placed on an opposite side of the end portion of the same connected with the optical fiber 120 will be referred to as an exit-side end portion hereinafter. The transparent member 112 has a sufficiently high transmission factor with respect to the fluorescence and the excitation light. The transparent member 112 may have a quadrangular prism shape and the like in place of the columnar shape as long as it is sufficiently thick so that propagation of the excited light is not affected.

The fluorescent substance 114 is provided at the exit-side end portion of the transparent member 112 placed on the opposite side of the end portion connected with the optical fiber 120. The fluorescent substance 114 has a rotationally symmetric shape. In more detail, the fluorescent substance 114 has a shape surrounded by a paraboloid of revolution and a plane perpendicular to a rotation axis of this paraboloid of revolution. This shape will be referred to as a paraboloidal shape of revolution hereinafter. The fluorescent substance 114 is installed so that its plane is inscribed on the other of the circular end surfaces of the transparent member 112 (the end on the opposite side of the end connected with the optical fiber 120) and the paraboloid of revolution is present on the excitation light incidence side.

The transparent member 112 and the fluorescent substance 114 are coaxially arranged. That is, a central axis of the columnar shape of the transparent member 112 coincides with a central axis of the paraboloidal shape of revolution of the fluorescent substance 114. Moreover, the fluorescent substance unit 110, i.e., the transparent member 112 and the fluorescent substance 114, is arranged coaxially with the exit end portion of the optical fiber 120. That is, the central axis of the transparent member 112 and the central axis of the fluorescent substance 114 coincide with a central axis of the exit end portion of the optical fiber 120. The central axis of each of the transparent member 112, the fluorescent substance 114, and the optical fiber 120 will be simply referred to as a central axis hereinafter without discrimination. Therefore, the excitation light enters the fluorescent substance 114 so that light at the center of its intensity distribution travels along the central axis of the fluorescent substance 114. The fluorescent substance 114 has the largest thickness near its central axis, and this thickness is reduced in proportion to the square of a distance from the central axis.

[Operation]

Figure 3:
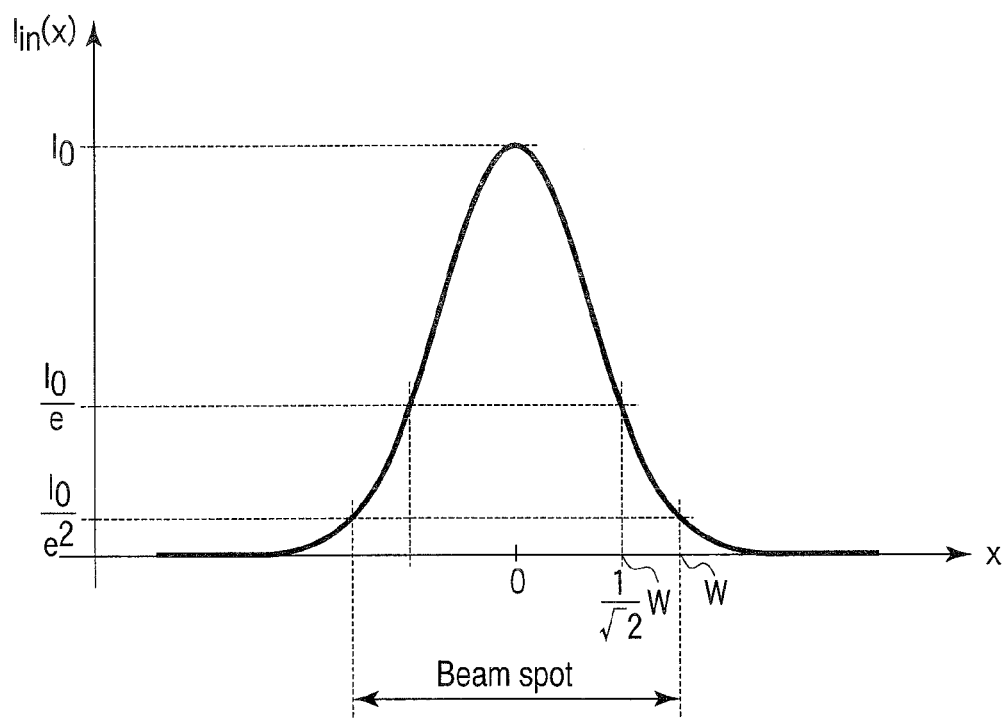
FIG. 3 shows an intensity distribution approximated to a Gaussian distribution.

The excitation light emitted from the excitation light source 130 is guided by the optical fiber 120 to enter the fluorescent substance unit 110. The excitation light that has entered the fluorescent substance unit 110 passes through the transparent member 112 in the fluorescent substance unit 110 to be applied to the fluorescent substance 114. The excitation light that enters the fluorescent substance 114 has an intensity distribution in which an intensity is maximum at the center and decreases as getting apart from the center. For example, the excitation light has an intensity distribution approximated to a Gaussian distribution. FIG. 3 shows the intensity distribution approximated to the Gaussian distribution. In FIG. 3, an abscissa represents a distance x from the central axis of the fluorescent substance 114, and 0 is set on the central axis. As shown in FIG. 3, the intensity distribution approximated to the Gaussian distribution is a distribution in which the intensity is maximum on the central axis and decreases as getting apart from the central axis. The intensity distribution approximated to the Gaussian distribution is represented by the following Expression (1).

$$I_{in}(x) = I_0 \exp\left[-2\left(\frac{x}{w}\right)^2\right] \quad (1)$$

where x is a distance from the central axis, $I_{in}(x)$ is an incident intensity of the excitation light at the distance x, $I_0$ is an incident intensity of the excitation light on the central axis, and w is a radius of a beam spot.

When the intensity distribution of the excited light is the intensity distribution approximated to the Gaussian distribution, a region of the fluorescent substance 114 irradiated with the excitation light is a region of the fluorescent substance 114 corresponding to the beam spot, and it is a region corresponding to a circular circumference on which the incident intensity of the excitation light is $1/e^2$ (e is a base of natural logarithm) of the incident intensity on the central axis and the inside of the circular circumference.

A part of the excitation light that has entered the fluorescent substance 114 is subjected to wavelength conversion to be turned to fluorescence by the fluorescent substance 114. The fluorescence is emitted in all directions (spatially all directions) at a point where the wavelength conversion is performed and repeatedly scattered in the fluorescent substance 114 to exit, whereby an intensity distribution of the fluorescence exiting from a surface opposite to an incidence plane of the fluorescent substance 114 for the excitation light is generally uniform as indicated by a dotted line in plotting of $I_{out}(x)$ in FIG. 1.

On the other hand, another part of the excitation light that has entered the fluorescent substance 114 passes through the fluorescent substance 114 and travels straightforward to exit without being subjected to the wavelength conversion to be turned to the fluorescence. A transmission intensity of this excitation light is determined in accordance with a thickness of the fluorescent substance 114 based on a Beer-Lambert law of $I_{out}(x)$ represented by the following Expression (2).

$$I_{out}(x) = I_{in}(x) \cdot 10^{-\alpha d(x)} \quad (2)$$

where x is a distance from the central axis, $I_{out}(x)$ is a transmission intensity of the excited light at a distance x, $I_{in}(x)$ is an incident intensity of the excitation light at the distance x, $\alpha$ is an absorption coefficient, and $d(x)$ is a thickness of the fluorescent substance 114 at the distance x. The absorption coefficient $\alpha$ is a ratio that the excitation light is absorbed by the fluorescent substance 114 per unit thickness. The absorption of the absorption coefficient $\alpha$ in Expression (2) means the wavelength conversion into the fluorescence, conversion into heat in the fluorescent substance 114, etc.

Figure 4:
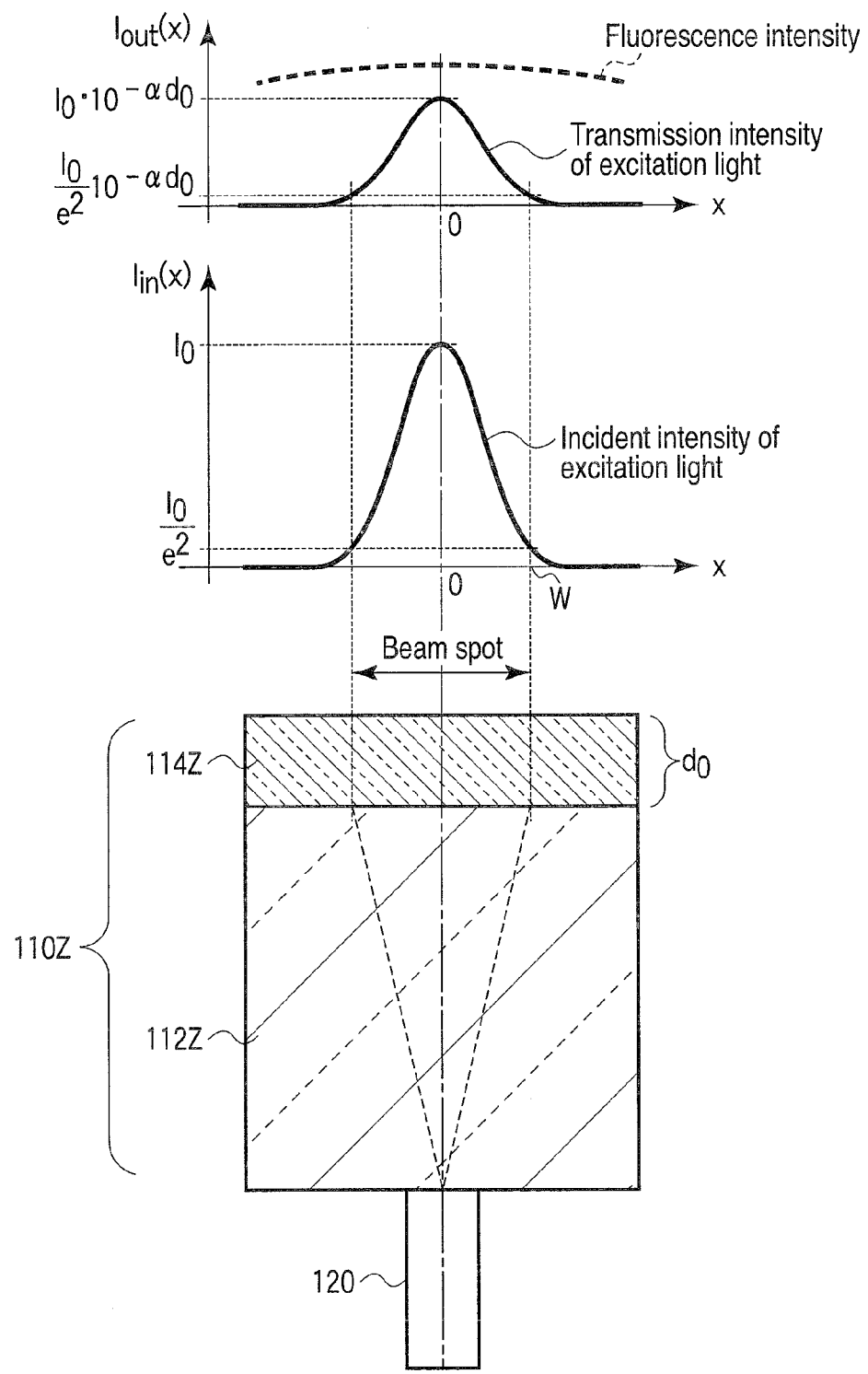
FIG. 4 shows a fluorescent substance unit having a conventional configuration.
Figure 5A:
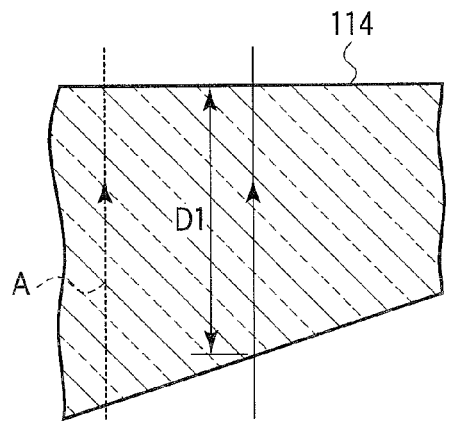
FIGS. 5A and 5B show how to take a thickness of a fluorescent substance.
Figure 5B:
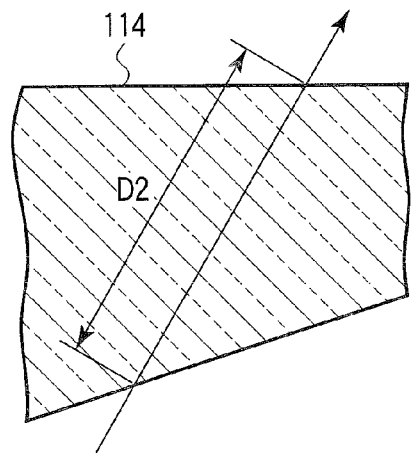

FIG. 4 shows a fluorescent substance unit having a conventional configuration as a comparative example. A fluorescent substance unit 110Z in this comparative example has a configuration that a columnar fluorescent substance 114Z having a uniform thickness $d_0$ is joined and connected to a circular end surface of an exit-side end portion of a columnar transparent member 112Z. In this comparative example, an intensity distribution of excitation light that has passed through the fluorescent substance 114Z is as represented by the following Expression (3), and it is represented as a distribution attenuated at a constant rate while maintaining a shape of the intensity distribution of the excitation light entering the fluorescent substance 114Z.

$$I_{out}(x) = I_{in}(x) \cdot 10^{-\alpha d_0} \quad (3)$$

On the other hand, when the excitation light having the intensity distribution shown in FIG. 2 has entered the fluorescent substance unit 110 having the configuration in FIG. 1 according to this embodiment, since the thickness of the fluorescent substance 114 on the central axis is equal to that in FIG. 4, an intensity of the excitation light that has passed along the central axis is the same as that in the configuration shown in FIG. 4, but the thickness of the fluorescent substance 114 in a peripheral portion (a position apart from the central axis) is smaller than that on the central axis, and hence the intensity of the excitation light that has passed through the peripheral portion is higher than that in the above-described comparative example in which the fluorescent substance 114Z shown in FIG. 4 has the uniform thickness.

Assuming that the distance from the central axis is z, a thickness of the fluorescent substance 114 surrounded by the paraboloid of revolution is maximum near the central axis, it is reduced in proportion to the square of the distance from the central axis, and a thickness $d(x)$ at the distance x is represented as $d(x)=d_0-kx^2$. At the distance x that the thickness $d(x)$ has a negative value, since the fluorescent substance 114 is not present, a radius of the fluorescent substance 114 is $(d_0/k)^{1/2}$. In other words, the thickness $d(x)$ of the fluorescent substance 114 at the distance x is represented by the following expression.

$$d(x) = d_0 - kx^2 \quad \ldots\ x \leq (d_0/k)^{1/2} \quad (4)$$
$$= 0 \quad \ldots\ x > (d_0/k)^{1/2}$$

When the intensity distribution of the excitation light entering the fluorescent substance 114 is the intensity distribution approximated to the Gaussian distribution represented by Expression (1) as described above, since a transmission intensity of the excitation light with respect to the incident intensity of the excitation light is represented by Expression (2) based on the Beer-Lambert law, a transmission intensity distribution of the excitation light is provided by $I_{out}(x)$ represented by the following Expression (5).

$$I_{out}(x) = I_0 \cdot 10^{-\alpha d_0} \exp\left[(\log_e 10) \cdot k \cdot \alpha \cdot x^2 - 2\left(\frac{x}{w}\right)^2\right] \ldots\ x \leq (d_0/k)^{1/2} \quad (5)$$
$$= I_0 \exp\left[-2\left(\frac{x}{w}\right)^2\right] \quad \ldots\ x > (d_0/k)^{1/2}$$

In this expression, when k takes a value represented by the following Expression (6), the intensity of the excitation light that has passed through the fluorescent substance 114 becomes constant in the range of $x \leq (d_0/k)^{1/2}$ as represented by the following Expression (7).

$$k = \frac{2 \log_{10} e}{\alpha \cdot w^2} \quad (6)$$

$$I_{out}(x) = I_0 \cdot 10^{-\alpha d_0} \quad \ldots\ x \leq (d_0/k)^{1/2} \quad (7)$$
$$= I_0 \exp\left[-2\left(\frac{x}{w}\right)^2\right] \ldots\ x > (d_0/k)^{1/2}$$

Further, a function of a thickness of the fluorescent substance 114 with which the excitation light intensity having passed through the fluorescent substance 114 becomes constant, which has been acquired here, is determined as a transmission intensity uniforming thickness function. The transmission intensity uniforming thickness function is determined based on Expressions (4) and (6). The thickness of the fluorescent substance 114 coincides with the transmission intensity uniforming thickness function. As a result, an intensity distribution of the excitation light that has passed through the fluorescent substance 114 in the irradiated region becomes constant. In FIG. 1, a value of $(d_0/k)^{1/2}$ is larger than a value of w, but a magnitude relation between the value of $(d_0/k)^{1/2}$ and the value of w differs depending on $d_0$. The radius of a region where the quantity of the transmitted excitation light becomes uniform may be smaller than the value of w depending on a necessary quantity of the transmitted excitation light. A value of $d_0$ is set based on a size of the region where the necessary quantity of the transmitted excitation light becomes uniform is set based on a value of $d_0$.

Since the thickness of the fluorescent substance 114 coincides with the transmission intensity uniforming thickness function, the thickness of the fluorescent substance 114 is smaller than that on the central axis by $(1/\alpha)\log_{10} e$ at a position where the incident intensity of the excitation light is $1/e$ of the incident intensity of the same on the central axis, and the thickness of the fluorescent substance 114 is smaller than that on the central axis by $(2/\alpha)\log_{10} e$ at a position where the incident intensity of the excitation light is $1/e^2$ of the incident intensity of the same on the central axis.

[Action and Effect]

Based on the above-described configuration, since the fluorescent substance 114 has the paraboloidal shape of revolution whose thickness is maximum on the central axis and reduced in proportion to the square of a distance from the central axis as represented by Expression (4), the intensity of the excitation light that has passed through the fluorescent substance 114 becomes uniform in the range of $x \le (d_0/k)^{1/2}$. Since the fluorescence subjected to the wavelength conversion in the fluorescent substance 114 generally uniformly exits as described above, an intensity ratio of the excitation light and the fluorescence exiting from the fluorescent substance unit 110 remains the same on both the central axis and the peripheral portion, whereby color shading of exiting mixed color light is reduced.

A ratio of the transmitted excitation light and the fluorescence is obtained from a desired color of output light in which colors of the transmitted excitation light and the fluorescence are mixed, a necessary excitation light intensity is acquired from an intensity of the fluorescence output from the fluorescent substance 114, and $d_0$ enabling acquisition of the necessary excitation light intensity is obtained by using Expression (7), thereby acquiring an output having a desired color. The intensity of the fluorescence at this moment may be obtained by averaging intensity distributions of the fluorescence output in the range where a distance from the central axis is smaller than a radius w of a beam spot of the excitation light, and it may be an intermediate value of a maximum value and a minimum value in this range.

Alternatively, the intensity of the fluorescence may be determined so that a radius of the fluorescent substance 114 can coincide with the radius w of the beam spot. In this case, $d_0 = (2/\alpha)\log_{10} e$ is achieved.

It is to be noted that the incident intensity distribution of the excitation light is approximated to the Gaussian distribution to provide the paraboloidal shape of revolution as the shape of the fluorescent substance 114 in this embodiment, but the shape of the fluorescent substance 114 may be obtained as an adjustable surface shape when the incident intensity distribution of the excitation light is a distribution greatly different from the Gaussian distribution. In this case, the thickness of the fluorescent substance 114 that linearly varies with respect to a logarithm of the incident intensity of the excitation light may be set as represented by Expression (8) under conditions that the transmission intensity $I_{out}(x)$ in Expression (2) is constant and equal to $I_{out}(0)$.

$$d(x) = \frac{1}{\alpha}[\log_{10}(I_{in}(x)) - \log_{10}(I_{out}(0))] \qquad (8)$$

In this embodiment, assuming that a gap between the exit end portion of the optical fiber 120 and the fluorescent substance 114 is larger than the thickness of the fluorescent substance 114 on the central axis, the thickness of the fluorescent substance 114 is determined as a dimension D1 along the central axis to obtain the shape of the fluorescent substance 114. Contrarily, when the gap between the exit end portion of the optical fiber 120 and the fluorescent substance 114 is smaller than the thickness of the fluorescent substance 114 on the central axis, since the excitation light entering the fluorescent substance 114 enters at an angle formed with respect to the central axis, the thickness of the fluorescent substance 114 may be determined as a dimension D2 along a traveling direction of the excitation light at each position of the fluorescent substance 114 to obtain the shape of the fluorescent substance 114. Since a distance that a light beam penetrates through the fluorescent substance 114 is reflected to determine the thickness, the transmission intensity distribution of the excitation light is further uniformed.

Furthermore, although the shape of the fluorescent substance 114 is a shape that the excitation light incidence side is convex and the transmitted excitation light exit side is flat in this embodiment, it may be a shape that the incidence side is flat and the exit side is convex. Moreover, it is also possible to adopt a shape that both the exit side and the incidence side are symmetrical and each of these sides has a paraboloid of revolution.

<Modification 1>

[Configuration and Operation]

Figure 6:
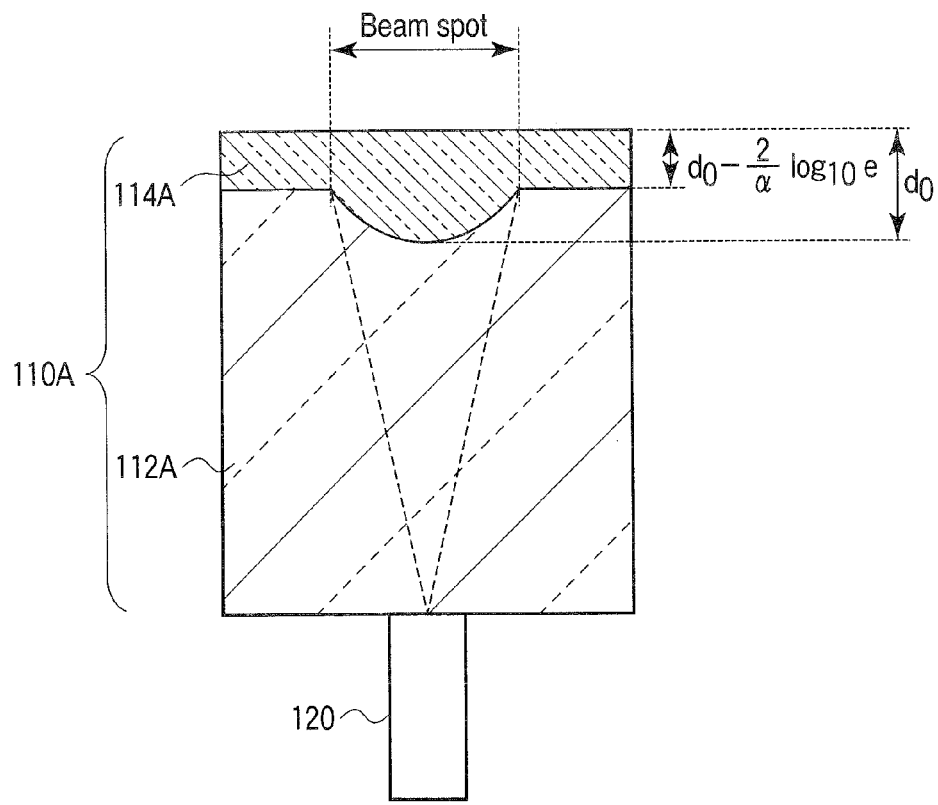
FIG. 6 shows a fluorescent substance unit according to a first modification of the first embodiment of the present invention.

FIG. 6 shows a fluorescent substance unit according to a first modification of the first embodiment according to the present invention. A fluorescent substance unit 110A according to this modification comprises a transparent member 112A and a fluorescent substance 114A provided at an exit-side end portion of the transparent member 112A. The fluorescent substance 114A has a shape that the inside of a region irradiated with excitation light, i.e., a beam spot is surrounded by a paraboloid of revolution and a plane perpendicular to a central axis of this paraboloid of revolution and the outside of the irradiated region, i.e., the beam spot is surrounded by two parallel planes. In other words, the fluorescent substance has a shape that a paraboloidal shape of revolution is stacked on a cylindrical column. That is, a thickness of the fluorescent substance 114A coincides with a transmission intensity uniforming thickness in the irradiated region, and it is constant outside the irradiated region. In other words, the thickness of the fluorescent substance 114A is represented by Expression (4) on a circular circumference on which an incident intensity of the excitation light is $1/e^2$ of an incident intensity of the same on the central axis and inside the circular circumference, and this thickness is constant in a region outside the circular circumference on which the incident intensity of the excitation light is $1/e^2$ of the incident intensity of the same on the central axis.

In this modification, a boundary between the paraboloid of revolution and its peripheral plane is placed on an outer circumference of the irradiated region, i.e., the circular circumference on which the incident intensity of the excitation light is $1/e^2$ of the incident intensity of the same on the central axis, but it may be placed in the irradiated region, i.e., the outside of the circular circumference on which the incident intensity of the excitation light is $1/e^2$ of the incident intensity of the same on the central axis.

[Action and Effect]

In this modification, the thickness of the fluorescent substance 114 is determined based on the transmission intensity uniforming thickness function so that the transmission intensity of the excitation light becomes uniform in the region corresponding to the beam spot of the incident excitation light, and the thickness of the fluorescent substance 114A is constant outside the region corresponding to the beam spot, i.e., the fluorescent substance 114A has a tabular portion. That is, in the region corresponding to the beam spot, when a transmission intensity distribution of the excitation light is uniformed like the first embodiment, an intensity ratio of the excitation light and fluorescence becomes uniform in the beam spot, thereby reducing color shading of exiting light.

Moreover, the fluorescent substance 114A has a tabular shape at an outer circumferential portion outside the region corresponding to the beam spot, and using the fluorescent substance 114A is facilitated by handling at this tabular portion when joining and connecting the fluorescent substance 114A to the transparent member 112A. Additionally, at the time of handling, a possibility that the region of the fluorescent substance 114A irradiated with the excitation light is cracked is reduced.

The configuration of this modification may be combined with shapes described in the following Modifications 3 to 5, and the same effect is obtained in this case.

<Modification 2>
[Configuration and Operation]

Figure 7:
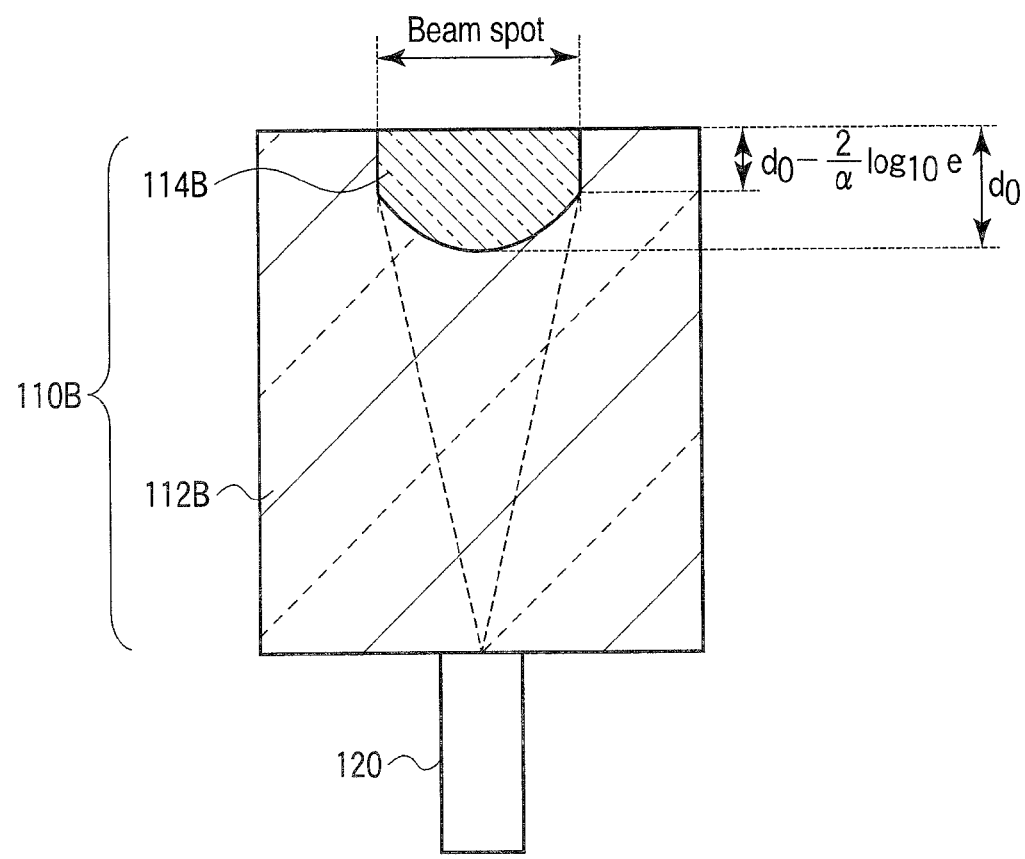
FIG. 7 shows a fluorescent substance unit according to a second modification of the first embodiment of the present invention.

FIG. 7 shows a fluorescent substance unit according to a second modification of the first embodiment of the present invention. A fluorescent substance unit 110B according to this modification comprises a transparent member 112B and a fluorescent substance 114B. The fluorescent substance 114B has a shape that a region irradiated with excitation light, i.e., the inside of a beam spot is surrounded by a paraboloid of revolution and a plane perpendicular to a central axis of this paraboloid of revolution, and it is not present outside the irradiated region, i.e., the beam spot. In other words, the fluorescent substance 114B has a shape obtained by cutting off a portion of the fluorescent substance 114 according to the first embodiment outside the region irradiated with the excitation light. That is, a thickness of the fluorescent substance 114B coincides with a transmission intensity uniforming thickness function in the irradiated region, and an outside diameter of the fluorescent substance 114B is generally equal to an outside diameter of the irradiated region. In other words, the thickness of the fluorescent substance 114B is represented by Expression (4) on a circular circumference on which an incident intensity of the excitation light is $1/e^2$ of an incident intensity of the same on the central axis and inside the circular circumference, and the outside diameter of the fluorescent substance 114B is generally equal to a diameter of the circular circumference on which the incident intensity of the excitation light is $1/e^2$ of the incident intensity on the central axis.

In this modification, although the outside diameter of the fluorescent substance 114B is generally equal to the diameter of the outer circumference of the irradiated region, i.e., the circular circumference on which the incident intensity of the excitation light is $1/e^2$ of the incident intensity on the central axis, it may be larger than the diameter of the irradiated region, i.e., the circular circumference on which the incident intensity of the excitation light is $1/e^2$ of the incident intensity on the central axis.

[Action and Effect]

According to this modification, in the region of the incident excitation light corresponding to the beam spot, the thickness of the fluorescent substance 114B is determined based on the transmission intensity uniforming thickness function so that a transmission intensity of the excitation light becomes uniform, and the fluorescent substance 114B is not present outside the region corresponding to the beam spot. In the region corresponding to the beam spot, when the transmission intensity distribution of the excitation light is uniformed like the first embodiment, the intensity ratio of the excitation light and the fluorescence remains the same in the beam spot, thus reducing color shading of exiting mixed color light.

Additionally, the fluorescent substance 114B is not present outside the region corresponding to the beam spot, and it can be constituted in a smaller size than Modification 1.

The configuration of this modification may be combined with shapes described in the following Modifications 3 to 5, and the same effect is obtained in such a case.

<Modification 3>
[Configuration]

Figure 8:
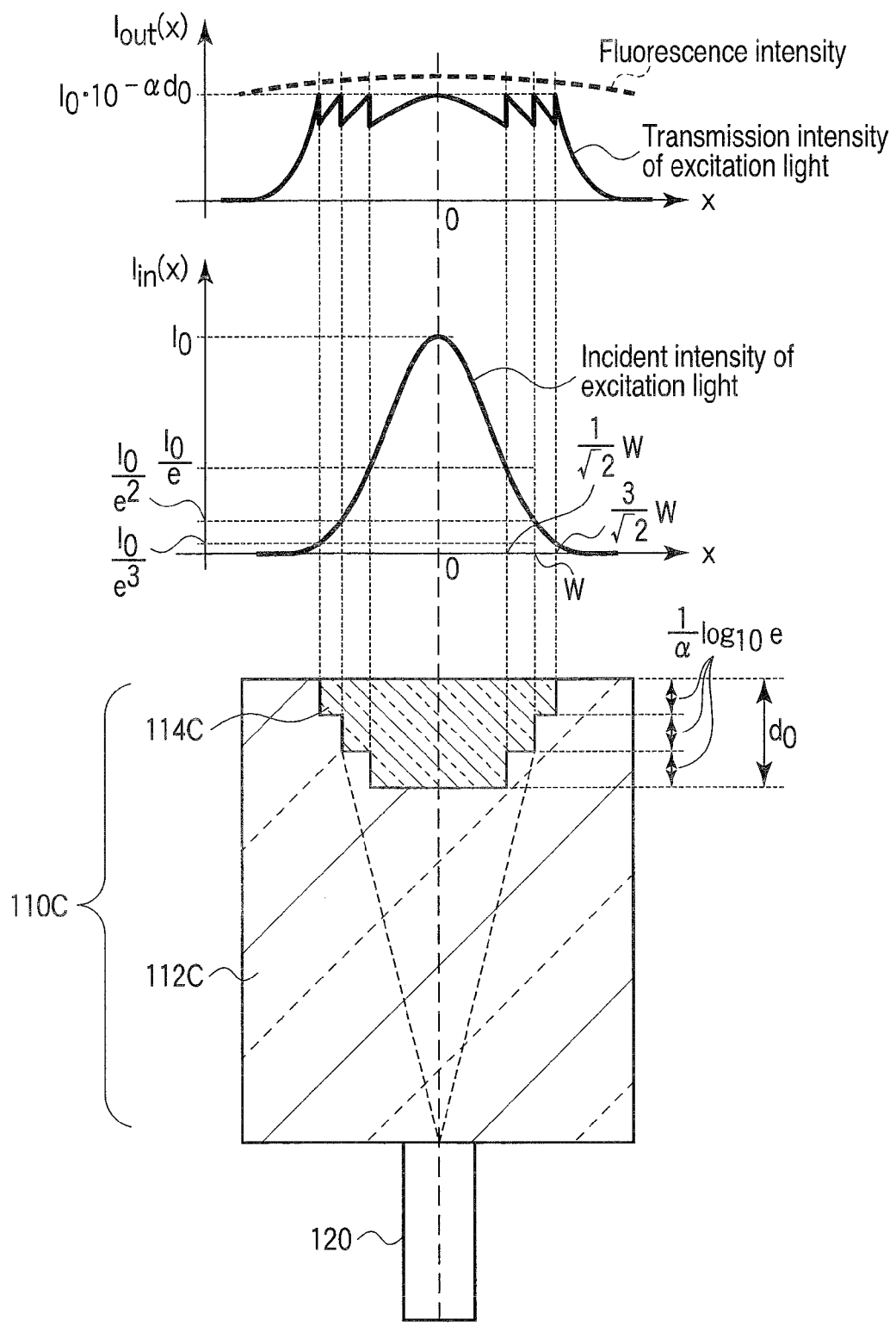
FIG. 8 shows a fluorescent substance unit according to a third modification of the first embodiment of the present invention.

FIG. 8 shows a fluorescent substance unit according to Modification 3 of the first embodiment of the present invention. A fluorescent substance unit 110C according to this modification comprises a transparent member 112C and a fluorescent substance 114C. The fluorescent substance 114C has a shape obtained by coaxially stacking a plurality of cylindrical columns having different diameters in order of diameter size. Radii of the plurality of cylindrical columns coincide with radii of circular circumferences on which incident intensities of excitation light are $1/e$, $1/e^2$, $1/e^3$, ... $1/e^n$ of an incident intensity on a central axis, respectively. When an incident intensity distribution of the excitation light may be approximated to a Gaussian distribution, the radii of the cylindrical columns are $(1/2)^{1/2}w$, $w$, $(3/2)^{1/2}w$, ... $(n/2)^{1/2}w$, respectively. Further, thicknesses of the cylindrical columns are all $(1/\alpha)\log_{10}e$.

As shown in FIG. 8, when the columnar fluorescent substance having a small diameter is placed on an incidence side of the excitation light and the columnar fluorescent substances having larger diameters are placed thereon so that a total of the three columnar fluorescent substances stack to form the fluorescent substance 114C, thicknesses at respective positions corresponding to distances from the central axis are $d(x)=(3/\alpha)\log_{10}e$ in case of $0 \leq x < (1/2)^{1/2}w$, $d(x)=(2/\alpha)\log_{10}e$ in case of $(1/2)^{1/2}w \leq x < w$, $d(x)=(1/\alpha)\log_{10}e$ in case of $w \leq x < (3/2)^{1/2}w$, and $d(x)=0$ in case of $(3/2)^{1/2}w$.

Here, in regard to $x=(1/2)^{1/2}w$ and $w$ with which the excitation light has the incident intensities of $I_0/e$ and $I_0/e^2$, the thicknesses of the fluorescent substance 114 area thickness $d((1/2)^{1/2}w)=d_0-(1/\alpha)\log_{10}e$ and a thickness $d(w)=d_0-(2/\alpha)\log_{10}e$ ($d_0$ used herein is the thickness of the fluorescent substance 114C on the central axis, and it is $(3/\alpha)\log_{10}e$ in this embodiment), and they cross on a circular circumference that satisfies $x=(1/2)^{1/2}w$ and $w$ with respect to a paraboloid of revolution defined from Expression (4) and Expression (6) that determine the shape of the fluorescent substance 114 according to the first embodiment. Further, in other words, since the thickness of the fluorescent substance 114C on the central axis is $d_0$, the thickness $d_0$ on the central axis is reduced by $(1/\alpha)\log_{10}e$ at a position where the incident intensity of the excitation light is an intensity $1/e$ with respect to the incident intensity $I_0$ on the central axis, and the thickness $d_0$ on the central axis is reduced by $(2/\alpha)\log_{10}e$ at a position where the incident intensity of the excitation light is an intensity $1/e^2$ with respect to the incident intensity $I_0$ on the central axis. Each of $x=w$ and $(1/2)^{1/2}w$ with which the excitation light has the incident intensities $I_0/e^2$ and $I_0/e$ suggests the circular circumference having a radius $w$ that is an outer circumference of a beam spot or the circular circumference having a radius $(1/2)^{1/2}w$ that is an outer circumference of a region having an area that is a half of the beam spot, and a transmission intensity equal to an intensity of the excitation light that has passed through the fluorescent substance 114C on the central axis is obtained on these circular circumferences.

[Action and Effect]

In this modification, the fluorescent substance 114C is formed by stacking the plurality of cylindrical columns having the same thickness, and it has a shape close to an ideal paraboloidal shape of revolution defined based on a transmission intensity uniforming thickness. Therefore, like the first embodiment, a transmission intensity distribution of the excitation light comes close to a uniform state, and a change in intensity ratio of the transmitted excitation light and fluorescence within the beam spot is reduced, thereby decreasing color shading of exiting mixed color light. Furthermore, since the fluorescent substance 114C is formed by stacking the cylindrical columns having the same thickness, fabrication is easier than the first embodiment.

The thickness $d_0$ of the fluorescent substance 114C on the central axis may be obtained from a desired color of output light as described in the first embodiment. When $d_0$ obtained from the desired color of the output light is different from the thickness of the fluorescent substance 114C constituted of the plurality of cylindrical columns on the central axis in this modification, a color of the output light can get closer to the desired color by adjusting a thickness of the cylindrical column having the largest diameter to set the entire thickness at $0 \leq x < (1/2)^{1/2} w$ to $d(x) = d_0$.

For example, in case of this modification constituted of the three cylindrical columns, when the thickness of the cylindrical column having a radius $x = (3/2)^{1/2} w$ is set to $d(x) = d_0 - (2/\alpha)\log_{10} e$, a total value of the thicknesses of the three cylindrical columns coincides with $d_0$, whereby a color of the output light can come close to the desired color.

Although the cylindrical columns are stacked in diameter ascending order from the excitation light irradiation side to constitute the fluorescent substance 114C in this modification, the cylindrical columns may be stacked in diameter descending order to constitute the fluorescent substance 114C.

It is to be noted that the fluorescent substance 114C according to this modification has the shape obtained by stacking the cylindrical columns, but it may have any other shape that provides the thickness $d(0) = d_0$ when $x=0$, $d((1/2)^{1/2}w) = d_0 - (1/\alpha)\log_{10}e$ when $x = (1/2)^{1/2}w$, or $d(w) = d_0 - (1/\alpha)\log_{10}e$ when $x = w$. For example, the fluorescent substance 114C may have a shape that the thickness of the fluorescent substance is determined by an expression of an ellipse having a focal point on the central axis.

<Modification 4>

[Configuration and Operation]

Figure 9:
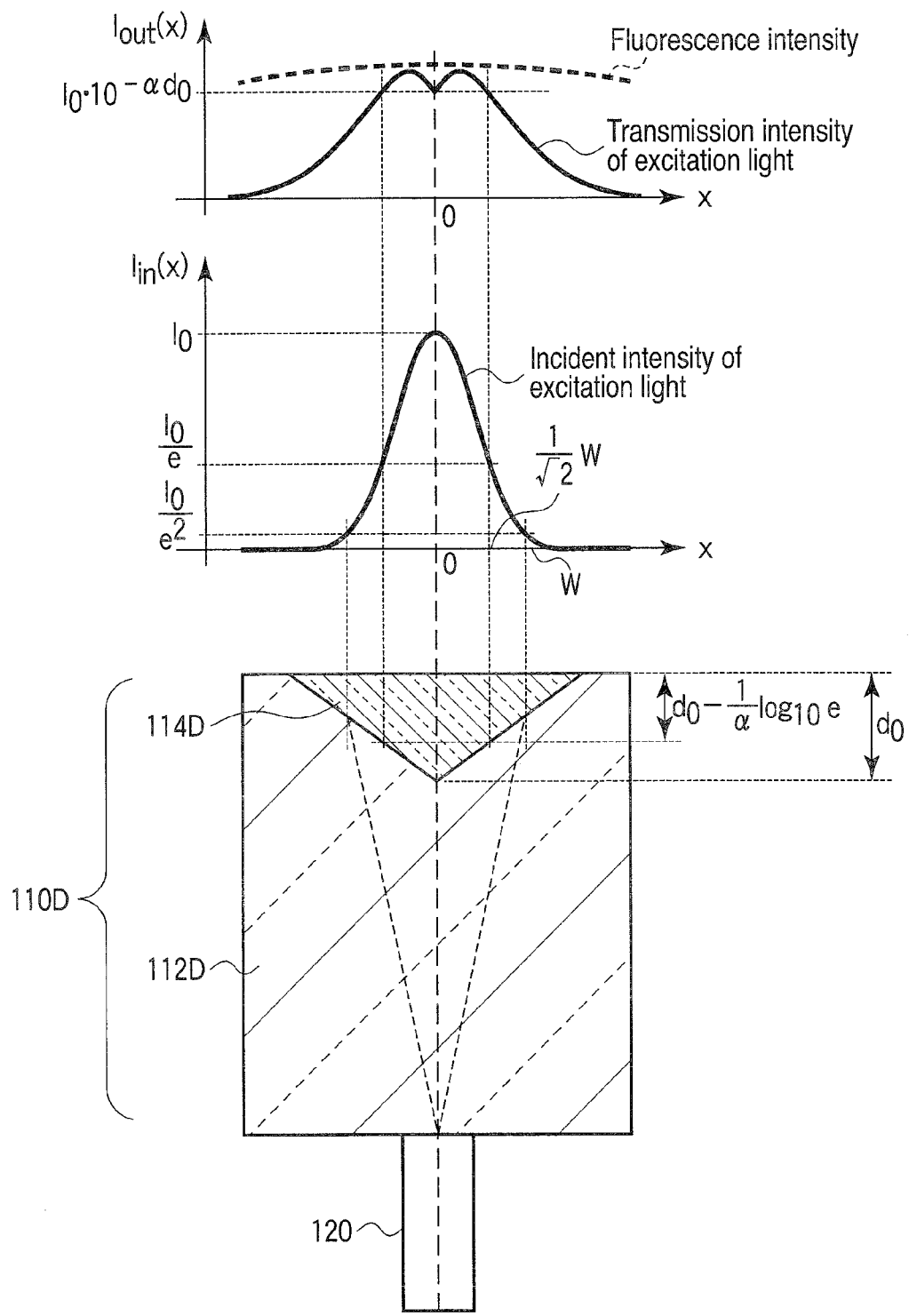
FIG. 9 shows a fluorescent substance unit according to a fourth modification of the first embodiment of the present invention.

FIG. 9 shows a fluorescent substance unit according to a fourth modification of the first embodiment of the present invention. A fluorescent substance unit 110D according to this modification comprises a transparent member 112D and a fluorescent substance 114D. The fluorescent substance 114D has a conical shape. The fluorescent substance 114D has a shape that a bottom surface of a cone is inscribed on a circular end surface on an opposite side of an end of the transparent member 112D connected with an optical fiber 120 and it protrudes toward an exit end of the optical fiber 120.

A central axis of a columnar shape of the transparent member 112D and a central axis of the conical shape of the fluorescent substance 114D coincide with a central axis of the optical fiber 120. Furthermore, a thickness of the conical fluorescent substance 114D is maximum on the central axis, which is a thickness $d_0$, the thickness is reduced as getting apart from the central axis, and its reduction amount is in proportion to a distance from the central axis. That is, the thickness of the fluorescent substance 114D is maximum on the central axis, and it is reduced in proportion to the distance from the central axis. When an incident intensity distribution of the excitation light is approximated to a Gaussian distribution, the thickness of the fluorescent substance 114D is smaller than the thickness of the same on the central axis by $(1/\alpha)\log_{10}e$ at a position where an incident intensity of the excitation light is $1/e$ of an incident intensity of the same on the central axis $(x = (1/2)^{1/2}w)$. That is, $d((1/2)^{1/2}w) = d_0 - (1/\alpha)\log_{10}e$ is achieved. $d_0$ may be obtained from a desired color of output light as described in the first embodiment.

[Action and Effect]

In this modification, the fluorescent substance 114D has the conical shape approximated to an ideal paraboloidal shape of revolution defined based on a transmission intensity uniforming thickness function. Therefore, like the first embodiment, a transmission intensity distribution of the excitation light comes close to a uniform state. As described above, since an exiting intensity distribution of fluorescence is generally uniform, a change in intensity ratio of transmitted excitation light and the fluorescence within a beam spot is reduced, thereby decreasing color shading of exiting mixed color light. Moreover, since the shape of the fluorescent substance 114D is simpler than that in the first embodiment, fabrication is easy.

<Modification 5>

[Configuration and Operation]

Figure 10:
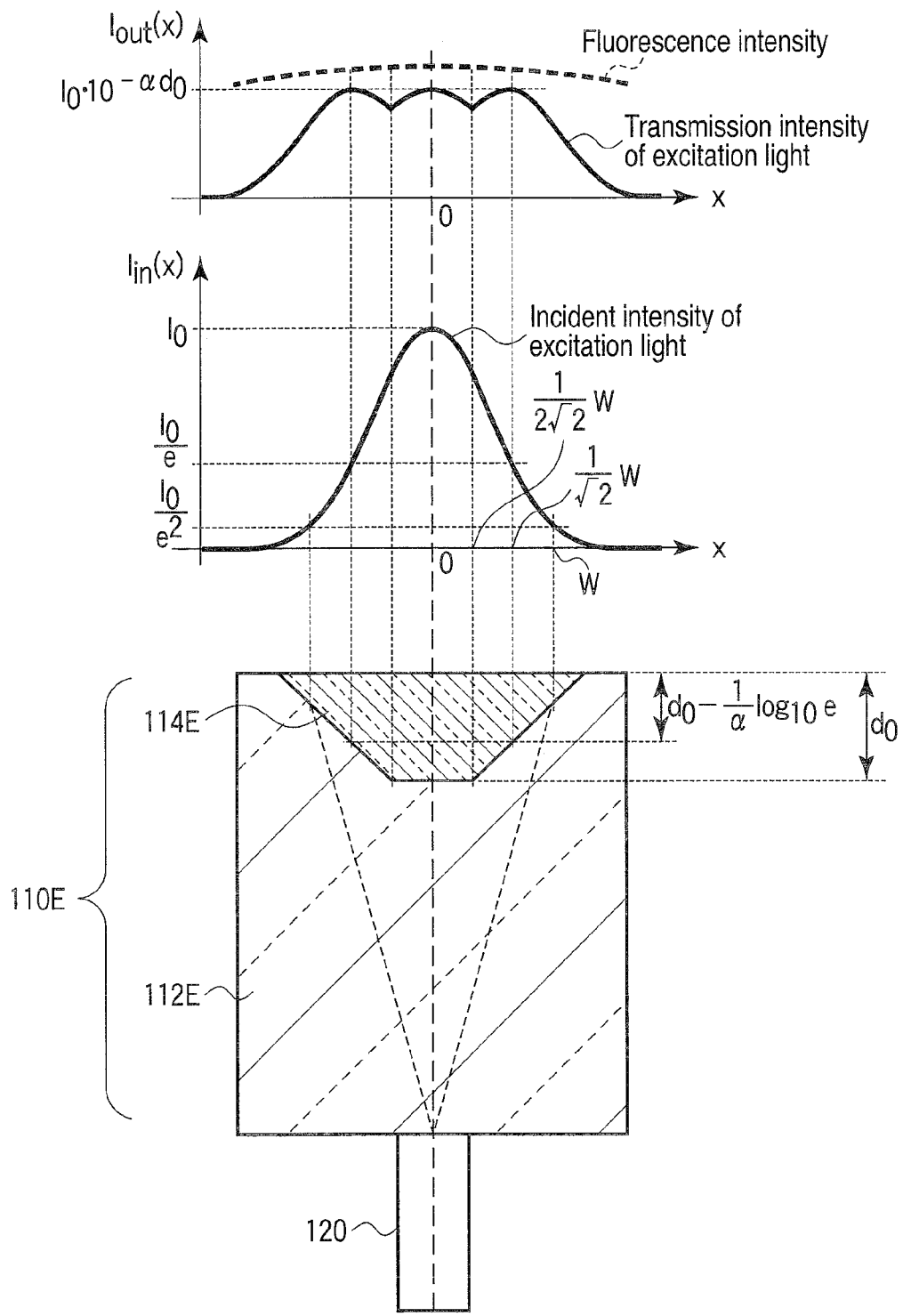
FIG. 10 shows a fluorescent substance unit according to a fifth modification of the first embodiment of the present invention.
Figure 11:
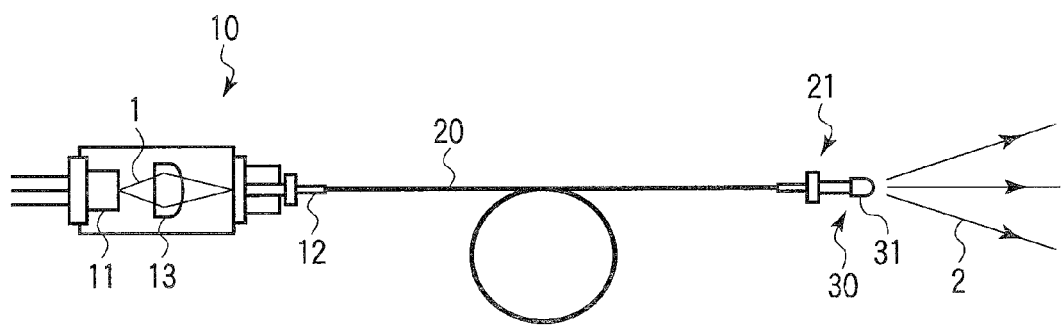
FIG. 11 shows a light-emitting apparatus, which is a conventional example of an illumination apparatus including a wavelength conversion unit.

FIG. 10 shows a fluorescent substance unit according to a fifth modification of the first embodiment of the present invention. A fluorescent substance unit 110E according to this modification comprises a transparent member 112E and a fluorescent substance 114E. The fluorescent substance 114E has a truncated conical shape. In the fluorescent substance 114E, a large-diameter surface end of the truncated cone is inscribed on a circular end surface on an opposite side of an end of the transparent member 112E connected with an optical fiber 120, and a small-diameter surface end is arranged on a side facing an exit end of the optical fiber 120.

A central axis of a cylindrical columnar shape of the transparent member 112E and a central axis of the truncated conical shape of the fluorescent substance 114E coincide with a central axis of the optical fiber 120. A thickness of the conical fluorescent substance 114E is maximum in the small-diameter surface portion of the truncated conical shape, which is a thickness $d_0$, and a value of a half of a distance between a position at which an incident intensity of excitation light is $I_0/e$ and the central axis is a radius of the small-diameter surface. The thickness is linearly reduced as getting apart from the central axis outside an outer circumference of the small-diameter surface. That is, the thickness of the fluorescent substance 114E is constant and maximum in the range of the inside of a second circular circumference that has the center at the central axis and a diameter that is a half of that of a first circular circumference on which an incident intensity of the excitation light is $1/e$ of an incident intensity on the central axis, and linearly reduced in the range of the outside of the second circumference in accordance with a distance from the central axis. When an incident intensity distribution of the excitation light is approximated to a Gaussian distribution, a value $1/2(1/2)^{1/2}w$ that is a half of a radius $(1/2)^{1/2}w$ of a circular circumference on which the incident intensity of the excitation light is $I_0/e$ is the radius of the small-diameter surface, and the thickness is $d((1/2)^{1/2}w) = d_0 - (1/\alpha)\log_{10}e$ at a position $(x = (1/2)^{1/2}w)$ where the incident intensity of the excitation light is $I_0/e$ outside the outer circular circumference of the small-diameter surface. The thickness of the fluorescent substance 114E is smaller than the thickness of the same on the central axis by $(1/\alpha)\log_{10}e$ at a position where the incident intensity of the excitation light is $1/e$ of the incident intensity of the same on the central axis. The thickness $d_0$ of the fluorescent substance 114 at the thickest portion may be obtained from a desired color of output light as described in the first embodiment.

[Action and Effect]

In this modification, the fluorescent substance 114E has the truncated conical shape approximated to an ideal paraboloidal shape of revolution defined based on a transmission intensity uniforming thickness function. Therefore, like the first embodiment, a transmission intensity distribution of the excitation light approaches a uniform state. As described above, since an exiting intensity distribution of fluorescence is generally uniform, a change in intensity ratio of transmitted excitation light and the fluorescence within a beam spot is reduced, thereby decreasing color shading of exiting mixed color light. Additionally, since the shape of the fluorescent substance 114E is simpler than that in the first embodiment, fabrication is easy. Further, a configuration of the fluorescent substance 114E is comparable in complexity to that of Modification 4, but the range that the transmission intensity of the excitation light is uniformed is wide as will be understood from comparison with FIG. 9 and FIG. 10.

As will be understood from the description above, the thickness of the fluorescent substance in the fluorescent substance unit according to embodiment and modifications of the present invention at the portion into which the light at the center of the excitation light intensity distribution enters is larger than those at any other portions. Furthermore, the fluorescent substance has the thickness such that the intensity of the excitation light having passed along the central axis of the fluorescent substance is generally equal to the intensity of the excitation light having passed through the fluorescent substance via a point on at least one circular circumference having the center at the central axis inside the region irradiated with the excitation light. In other words, the thickness of the fluorescent substance coincides with the transmission intensity uniforming thickness function on the central axis and the circular circumference.

Although the embodiment according to the present invention has been described with reference to the drawings, the present invention is not restricted to the embodiment, and it may be modified or changed without departing from the scope of the invention.

What is claimed is:

1. A wavelength conversion unit comprising a wavelength conversion member that transmits a part of incident excitation light and converts a part of the excitation light into wavelength-converted light having a wavelength different from a wavelength of the excitation light to emit the wavelength-converted light,
wherein the excitation light has an intensity distribution in which an intensity is maximum at a center and decreases as getting apart from the center, and
a thickness of the wavelength conversion member at a portion into which light at the center of the intensity distribution of the excitation light enters is larger than those at any other portions,
wherein the wavelength conversion member has a rotationally symmetric shape, the excitation light enters the wavelength conversion member so that light at the center of the intensity distribution travels along a central axis of the wavelength conversion member, and the wavelength conversion member has a thickness such that an intensity of the excitation light having passed along the central axis of the wavelength conversion member is generally equal to an intensity of the excitation light having passed through the wavelength conversion member via a point on at least one circular circumference having the center at the central axis inside a region irradiated with the excitation light,
wherein the excitation light that enters the wavelength conversion member has an intensity distribution approximated to a Gaussian distribution, and the thickness of the wavelength conversion member coincides with a transmission intensity uniforming thickness function on the central axis and the circular circumference, where the transmission intensity uniforming thickness function is a function of the thickness of the wavelength conversion member with which an intensity distribution of the excitation light having passed through the wavelength conversion member becomes constant in the range of a predetermined distance from the central axis of the wavelength conversion member, and
wherein the transmission intensity uniforming thickness function is represented by the following expression:

$$d(x) = d_0 - kx^2 \quad \ldots \quad x \leq (d_0/k)^{1/2}$$
$$= 0 \quad \ldots \quad x > (d_0/k)^{1/2}$$
$$k = \frac{2\log_{10} e}{\alpha \cdot w^2}$$

where x is a distance from the central axis, d(x) is a thickness of the wavelength conversion member at the distance x, $d_0$ is a thickness of the wavelength conversion member on the central axis, $\alpha$ is an absorption coefficient that is a ratio that the excitation light is absorbed by the wavelength conversion member per unit thickness, and w is a radius of the irradiated region.

2. A wavelength conversion unit comprising a wavelength conversion member that transmits a part of incident excitation light and converts a part of the excitation light into wavelength-converted light having a wavelength different from a wavelength of the excitation light to emit the wavelength-converted light,
wherein the excitation light has an intensity distribution in which an intensity is maximum at a center and decreases as getting apart from the center, and
a thickness of the wavelength conversion member at a portion into which light at the center of the intensity distribution of the excitation light enters is larger than those at any other portions,
wherein the wavelength conversion member has a rotationally symmetric shape, the excitation light enters the wavelength conversion member so that light at the center of the intensity distribution travels along a central axis of the wavelength conversion member, and the wavelength conversion member has a thickness such that an intensity of the excitation light having passed along the central axis of the wavelength conversion member is generally equal to an intensity of the excitation light having passed through the wavelength conversion member via a point on at least one circular circumference having the center at the central axis inside a region irradiated with the excitation light,
wherein the excitation light that enters the wavelength conversion member has an intensity distribution approximated to a Gaussian distribution, and the thickness of the wavelength conversion member coincides with a transmission intensity uniforming thickness function on the central axis and the circular circumference, where the transmission intensity uniforming thickness function is a function of the thickness of the wavelength conversion member with which an intensity distribution of the excitation light having passed through the wavelength conversion member becomes constant in the range of a predetermined distance from the central axis of the wavelength conversion member, wherein the thickness of the wavelength conversion member coincides with the transmission intensity uniforming thickness function at a position where an incident intensity of the excitation light into the wavelength conversion member is $1/e^n$ (n is a natural number) of an incident intensity on the central axis, wherein the thickness of the wavelength conversion member coincides with the transmission intensity uniforming thickness function inside the irradiated region, and wherein, assuming that $\alpha$ is an absorption coefficient that is a ratio that the excitation light is absorbed by the wavelength conversion member per unit thickness, the thickness of the wavelength conversion member is smaller than the thickness of the same on the central axis by $(1/\alpha)\log_{10}e$ at a position where an incident intensity of the excitation light is 1/e of an incident intensity of the same on the central axis, and the thickness of the wavelength conversion member is smaller than the thickness of the same on the central axis by $(2/\alpha)\log_{10}e$ at a position where an incident intensity of the excitation light is $1/e^2$ of the incident intensity of the same on the central axis.

3. An illumination apparatus comprising:

an excitation light source that emits excitation light; and a wavelength conversion unit having a wavelength conversion member that receives the excitation light, transmits a part of the excitation light, and converts a part of the excitation light into wavelength-converted light having a wavelength different from a wavelength of the excitation light to emit the wavelength-converted light, wherein the excitation light has an intensity distribution in which an intensity is maximum at a center and decreases as getting apart from the center, and a thickness of the wavelength conversion member at a portion into which light at the center of the intensity distribution of the excitation light enters is larger than those at any other portions;

the illumination apparatus further comprising:

a light guide member that guides the excitation light from the excitation light source to the wavelength conversion unit, wherein the wavelength conversion member has a rotationally symmetric shape, an exit end portion of the light guide member is arranged coaxially with the wavelength conversion member, the excitation light enters the wavelength conversion member so that light at the center of its intensity distribution travels along a central axis of the wavelength conversion member, and the wavelength conversion member has a thickness with which an intensity of the excitation light having passed through the wavelength conversion member on the central axis becomes generally equal to an intensity of the excitation light having passed through the wavelength conversion member via a point on at least one circular circumference having the center at the central axis inside a region irradiated with the excitation light, wherein the excitation light that enters the wavelength conversion member has an intensity distribution approximated to a Gaussian distribution, the thickness of the wavelength conversion member coincides with a transmission intensity uniforming thickness function on the central axis and the circular circumference, where the transmission intensity uniforming thickness function is a function of the thickness of the wavelength conversion member with which an intensity distribution of the excitation light having passed through the wavelength conversion member becomes constant in the range of a predetermined distance from the central axis of the wavelength conversion member, wherein the transmission intensity uniforming thickness function is represented by the following expression:

$$d(x) = d_0 - kx^2 \quad \ldots \quad x \leq (d_0/k)^{1/2}$$
$$= 0 \quad \ldots \quad x > (d_0/k)^{1/2}$$
$$k = \frac{2\log_{10}e}{\alpha \cdot w^2}$$

where x is a distance from the central axis, d(x) is a thickness of the wavelength conversion member at the distance x, $d_0$ is a thickness of the wavelength conversion member on the central axis, $\alpha$ is an absorption coefficient that is a ratio that the excitation light is absorbed by the wavelength conversion member per unit thickness, and w is a radius of the irradiated region.

4. An illumination apparatus comprising:

an excitation light source that emits excitation light; and a wavelength conversion unit having a wavelength conversion member that receives the excitation light, transmits a part of the excitation light, and converts a part of the excitation light into wavelength-converted light having a wavelength different from a wavelength of the excitation light to emit the wavelength-converted light, wherein the excitation light has an intensity distribution in which an intensity is maximum at a center and decreases as getting apart from the center, and a thickness of the wavelength conversion member at a portion into which light at the center of the intensity distribution of the excitation light enters is larger than those at any other portions, the illumination apparatus, further comprising:

a light guide member that guides the excitation light from the excitation light source to the wavelength conversion unit, wherein the wavelength conversion member has a rotationally symmetric shape, an exit end portion of the light guide member is arranged coaxially with the wavelength conversion member, the excitation light enters the wavelength conversion member so that light at the center of its intensity distribution travels along a central axis of the wavelength conversion member, and the wavelength conversion member has a thickness with which an intensity of the excitation light having passed through the wavelength conversion member on the central axis becomes generally equal to an intensity of the excitation light having passed through the wavelength conversion member via a point on at least one circular circumference having the center at the central axis inside a region irradiated with the excitation light, wherein the excitation light that enters the wavelength conversion member has an intensity distribution approximated to a Gaussian distribution, the thickness of the wavelength conversion member coincides with a transmission intensity uniforming thickness function on the central axis and the circular circumference, where the transmission intensity uniforming thickness function is a function of the thickness of the wavelength conversion member with which an intensity distribution of the excitation light having passed through the wavelength conversion member becomes constant in the range of a predetermined distance from the central axis of the wavelength conversion member, wherein the thickness of the wavelength conversion member coincides with the transmission intensity uniforming thickness function at a position where an incident intensity of the excitation light into the wavelength conversion member is $1/e^n$ (n is a natural number) of an incident intensity on the central axis, wherein the thickness of the wavelength conversion member coincides with the transmission intensity uniforming thickness function inside the irradiated region, wherein, assuming that cc is an absorption coefficient that is a ratio that the excitation light is absorbed by the wavelength conversion member per unit thickness, the thickness of the wavelength conversion member is smaller than the thickness of the same on the central axis by $(1/\alpha)\log_{10}e$ at a position where an incident intensity of the excitation light is $1/e$ of an incident intensity of the same on the central axis, and the thickness of the wavelength conversion member is smaller than the thickness of the same on the central axis by $(2/\alpha)\log_{10}e$ at a position where an incident intensity of the excitation light is $1/e^2$ of the incident intensity of the same on the central axis.

* * * * *